Dec. 15, 1970  E. M. PARKS  3,546,958
POSITIVE LOCKING GENEVA MOTION MECHANISM
Filed Jan. 14, 1969
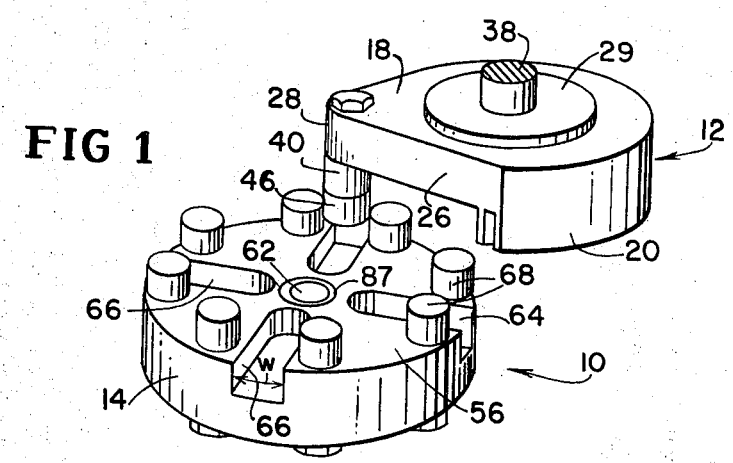
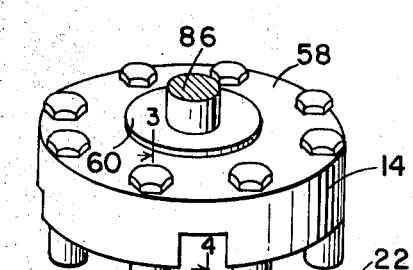
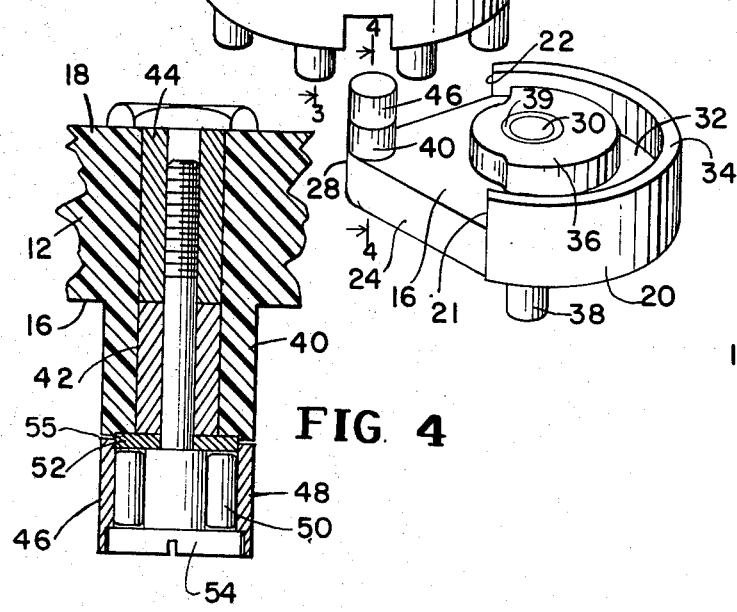
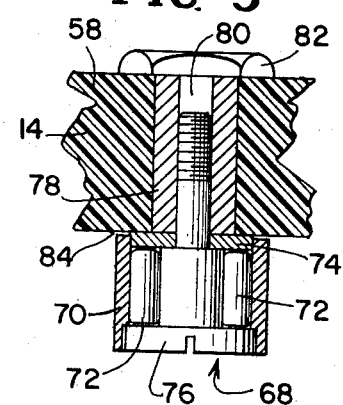
Inventor
ELLSWORTH M. PARKS
By *Irving Faber*
Attorney

# United States Patent Office 3,546,958
Patented Dec. 15, 1970

3,546,958
POSITIVE LOCKING GENEVA MOTION
MECHANISM
Ellsworth M. Parks, 241 N. Lincoln St.,
Batavia, Ill. 60510
Filed Jan. 14, 1969, Ser. No. 790,983
Int. Cl. F16h 27/04, 55/04
U.S. Cl. 74—436
9 Claims

ABSTRACT OF THE DISCLOSURE

A positive locking intermittent rotary motion device which includes a continually rotating drive member in a cooperating relationship with an indexing member, means to impart intermittent motion to the index member, and positive means to lock the indexing member during a portion of each revolution of the drive member. The means to impart intermittent motion to the indexing member includes a cam follower positioned on one face of the drive member which engages a plurality of radial slots on one face of the indexing member; each time the cam follower engages a radial slot, the indexing member moves a fraction of a revolution for each full revolution of the drive member. The positive lock means includes a precision groove on the same face and opposite the cam follower of the drive member. A pair of anti-friction roller bearings are disposed adjacent each of the radial slots along the periphery of the indexing member. The precision groove and the cam follower, of the drive member are disposed relative to one another so that during the dwell period of the indexing member, that is the period in which the cam follower is not engaged in one of the plurality of slots, a pair of roller bearings is engaged by the precision groove to inhibit movement and vibration of the indexing member while the drive member continually rotates. When the cam follower is about to engage the next successive slot on the indexing member, the pair of roller bearings engaged by the precision groove pass therefrom. The next pair of roller bearings which are adjacent the slot engaged by the cam follower, are engaged by the precision groove as the cam follower is disengaged from the slot.

BACKGROUND OF THE INVENTION

This invention relates to an intermittent rotary motion device based on the Geneva motion principle of converting continuous motion into precisely timed intermittent motion, and more particularly to an improved intermittent rotary motion device which includes positive locking means to insure accurate indexing, smoother operation, and reliable locking of the index member during its dwell period.

Mechanisms using the Geneva motion principle are well known, such prior mechanisms being disclosed in U.S. Pats. 1,224,079; 2,378,987; and 2,625,833; known to the inventor. Devices such as represented in these patents, although they use the Geneva type drive mechanism use various means which inhibit motion of the indexing member during its dwell period.

The means used in these and other prior art devices are not only expensive to manufacture but are not reliable in that they do not positively lock the index member during its dwell period. The majority of Geneva motion mechanisms manufactured today use a barrel cam. The mechanisms using barrel cams are not only substantially more expensive than the device embodied by this invention but such prior art mechanisms and/or devices do not have the positive locking means embodied by this invention. When the index member is not positively locked during the dwell period, many rejects are produced; this is not only inconvenient, but expensive.

The positive locking means embodying this invention positively locks the index member during its dwell period eliminating vibrations and movements to the indexing member during the dwell period thus enabling machines and systems using the Geneva type mechanism to operate more reliably and efficiently, as well as to be manufactured at a substantial reduction in cost from prior art mechanisms.

SUMMARY OF THE INVENTION

The positive locking means embodying the invention includes a precision arcuate groove machined on the inner face of the continually rotating driver wheel which engages a pair of anti-friction roller bearings adjacent to each one of the plurality of radial slots on the inner face of the indexing or intermittent rotary member. A cam follower positioned opposite the precision groove engages one of the radial slots on the indexing member for each revolution of the driving member. When the cam follower is disengaged from one of the slots the precision groove engages the pair of anti-friction roller bearings adjacent the slot, inhibiting further movement and/or vibration of the indexing member. When the cam follower is about to engage the next successive slot of the indexing member on its next revolution, the pair of roller bearings within the precision groove are disengaged therefrom enabling the indexing member to be rotated once more.

The precision groove of the driving member engages the pair of roller bearings adjacent each slot of the indexing member positively locking the indexing member during its dwell period; the dwell period is that period in time when the cam follower is not engaged in one of the plurality of radial slots.

The invention also provides roller bearings coupled to the indexing member adjacent each slot to provide a positive lock during the dwell period as the bearings pass through the precision groove without binding.

The positive locking means embodying this invention enables Geneva type motion mechanisms to be manufactured at a substantially lower cost than prior art devices using barrel cams as well as providing a positive lock for the index member to eliminate vibration and slippage of the index member during its dwell period experienced in the prior art mechanisms and devices.

The foregoing and other significant advantages of the invention will become apparent from the ensuing disclosure in which a preferred embodiment is described in detail and illustrated by the accompanying drawing.

BRIEF DESCRIPTION OF THE DRAWING

FIG. 1 is an exploded view of the invention illustrating the driving and indexing member and in particular the roller bearings adjacent the slots of the indexing member.

FIG. 2 is a perspective view of the invention illustrating the driving and indexing members and in particular the precision groove and the cam follower.

FIG. 3 is a sectional view taken along the line 3—3 of FIG. 2 and in the direction indicated generally.

FIG. 4 is a sectional view taken along line 4—4 of FIG. 2 and in the direction indicated generally.

DESCRIPTION OF THE PREFERRED EMBODIMENT

Referring to FIG. 1 the positive locking intermittent rotary motion device embodying the invention is designated generally by the reference character 10. The device is comprised of a continuously rotating drive member 12, an intermittently rotating indexing member 14, and positive locking means whereby the indexing member is positively locked during a portion of a revolution of the drive member.

The drive member 12 is of a pie-shaped design which has an inner face 16, an outer face 18, and a semi-circular peripheral face 20 having end surfaces 21 and 22 as illustrated in FIG. 2. A pair of radial surfaces 24 and 26, of equal length, extend from the end surfaces 21, 22 of the semi-circular peripheral face 20 to the geometric center 28 intersecting thereat. It is understood that various other geometric shapes may be used with the same efficiency and reliability as the pie-shaped design illustrated in FIGS. 1 and 2 of the drawings.

A circular flange 29 is integral with the outer face 18 and coaxial with the drive member 12. An aperture 30 is centrally disposed through the circular flange 29 and the drive member 12.

The inner face 16 of the drive member 12 has a precision groove 32 which is machined slightly inward from the semi-circular peripheral face 20 and extends the length of its arc between ends 21 and 22. A peripheral ridge 34 and an arcuate flange 36 are formed when the precision groove 32 is machined, the ridge 34 extending vertically from the inner face 16; the arcuate flange 36 and the peripheral ridge 34 extending an equal vertical distance from the inner face 16. The arcuate flange 36 is coaxial with the circular flange 29; the aperture 30 passing through the arcuate flange 36.

One end of a drive shaft 38 is coupled to the drive member 12 through a bushing 39 to the aperture 30 by means well known in the art, and the other end of the drive shaft 38 to a motor, not illustrated, or to any other suitable device for imparting a continuous rotary motion to the drive member 12.

A nodule 40 is machine formed and integral with the inner face 16, of the drive member 12, the nodule being positioned adjacent the geometric center 28 as defined by the intersection of the radial surfaces 21 and 22. A passageway 42 illustrated in FIG. 4 is centrally disposed through the nodule 40 extending through the outer face 18 of the drive member 12. A threaded locknut 44 is friction fitted into passage 42. A cam follower 46 is coupled to the nodule 40.

The cam follower 46 is comprised of a typical anti-friction roller bearing, well known in the art, having a race 48 rotatable about a plurality of rollers 50. The rollers 50 are interposed between a bushing 52 and a lock screw 54 which passes through the nodule 40 engaging the threaded locknut 44 coupling the cam follower 46 to the nodule 40. A space 55 is defined between one end of the nodule 40 and one end of the race 48, to enable the race 48 to rotate about the rollers 50 without frictionally binding with the nodule 40.

The indexing or intermittent rotation member 14 is of a circular configuration having an inner side or face 56 and an outer side or face 58; however, it is understood that various other geometrical configurations may be used. An outer flange 60 is coaxial with the index member 14. An aperture 62 is centrally disposed through the index member 14 and the outer flange 60. The indexing wheel 14 has a plurality of machined radial slots 64 having side walls 66; four slots being illustrated in the drawing. The radial slots 64 as illustrated do not intersect the aperture 62; however, it is understood that said radial slots could intersect with aperture 62. It is understood that any number of slots may be used; the number of slots depend upon amount of rotation desired for the indexing member 14 for each revolution of the driving member. The width $w$ of the radial slots 64 is such that the race 48 of the cam follower 46 frictionally engages the side walls 66 but does not inhibit the race 48 from rotating about the rollers 50.

A pair of anti-friction roller bearings 68, said bearings being well known in the art, are disposed adjacent each of the radial slots 64 and are coupled to the indexing member 14 along its periphery. It is understood that a single roller bearing 68 may be substituted for the pair of roller bearings. FIG. 3 illustrates a typical coupling of a roller bearing 68 to the indexing member 14. The roller bearing 68 comprises a race 70 rotatably coupled to a plurality of rollers 72. The rollers 72 are interposed between a bushing 74 and a lock screw 76. An aperture 78 extends through the indexing wheel 14; the roller bearings 68 and the passageway 78 being coaxial. A threaded locknut 80 having a head 82 is frictionally inserted into passageway 78; the head 82 abutting the outer face 58 of the indexing wheel 14. The threaded lock screw 76 engages the threaded locknut 80 in passageway 78 coupling the roller bearing 68 to the inner face 56 of the indexing wheel 14; the bushing 74 defining a space 84 between the inner face 56 and the race 70 enable the race 70 to rotate freely about the rollers 72.

One end of a shaft 86 is coupled to the indexing member through a bushing 87 to the aperture 62 by means well known in the art. The outer flange 62 extends slightly above the heads 82 of the threaded locknut 80 to enable the indexing member 14 to rotate without binding on the heads 82. The other end of shaft 86 is coupled to a plate or other device, not shown, to which it is desired to impart intermittent motion.

The drive member 12 and the indexing member 14 are positioned relative to each other to enable the cam follower 46 to engage one of the plurality of radial slots 64 for each revolution of the driving member. One of the plurality of radial slots 64 is engaged for each revolution of the driving member 12. The cam follower imparts motion to the indexing member 14 as it engages the radial slot 64 and transverses it; motion ceasing as the cam follower is disengaged therefrom.

The positive locking action of the device occurs as the cam follower 46 exits the radial slot 64. At this time the precision groove 32 engages the pair of roller bearings 68 adjacent the slot which the cam follower 46 has just traversed. The roller bearings 68 frictionally engage the walls 88 of the precision groove 32 inhibiting further motion of the indexing member during the remaining time interval in which the driving member 12 completes a full revolution. The pair of roller bearings 68 engaged by the precision groove 32 inhibit movement of the indexing member, the movement being caused by vibrations of the apparatus of system with which the invention is used. The roller bearings with rotatable races 70 insure that the bearing will not bind within the precision groove 32 during the dwell period of the indexing member while simultaneously providing an efficient and reliable locking mechanism inhibiting movement of the indexing member.

The driving member 12 and indexing member 14 can be molded or formed from any suitable material, such as metal, plastic, or the like, to obtain suitable strength for operative reliability and efficiency in any device or system in which they are used.

It is believed that the invention has been described in sufficient detail to enable the skilled artisan to understand and practice the same. Minor variations in size, proportion, and arrangement of parts thereof may be made without departing from the spirit and scope of the invention.

What is desired to be secured by Letters Patent of the United States is:

1. A positive locking Geneva motion mechanism comprising:
   a rotating drive member;
   a cam follower coupled to said drive member;
   an index member;
   a plurality of radial slots positioned on said index member, said index member and said drive member being positioned relative to each other to enable the cam follower to engage one of the plurality of radial slots driving the index member a fraction of a revolution for each revolution of the drive member;

a roller bearing adjacent each of said plurality of radial slots; and, a groove integral with said drive member and positioned opposite said cam follower on the same face of said drive member, the roller bearing engaging the groove when the cam follower is disengaged from one of the plurality of radial slots, positively locking the index member during the fraction of a revolution when the cam follower is not engaged in one of the plurality of radial slots.

2. A positive locking Geneva motion mechanism as defined in claim 1 wherein each roller bearing comprises:

a race which is rotatable about a plurality of rollers, the race frictionally engaging the walls of said groove without binding therein.

3. A positive locking Geneva motion mechanism as defined in claim 2 wherein the groove is defined by an arcuate flange and peripheral ridge, said arcuate flange and peripheral ridge being integral with and on the same face of said drive member.

4. A positive locking Geneva motion mechanism as defined in claim 3 wherein said cam follower comprises an anti-friction roller bearing coupled to a nodule, said nodule being integral with said drive member, and said anti-friction roller bearing being of a diameter to frictionally engage said plurality of radial slots without binding therein.

5. A positive locking Geneva motion mechanism comprising:

a rotating drive member having an inner and outer face;

a cam follower coupled to the inner face of said drive member;

an outer flange integral with the outer face of said drive member and having drive member aperture coaxial with said flange and said drive member which extends through said drive member and flange;

a shaft having one end coupled to the drive member aperture and the other end coupled to means for imparting continual rotation to said drive member;

a groove defined between said arcuate flange and said peripheral ridge, the groove and cam follower being disposed opposite each other;

an index member having a circular shape and a centrally disposed index aperture;

a plurality of radial slots disposed on one face of said index member, the index member and the drive member being disposed relative to each other to enable the cam follower to engage one of the plurality of radial slots driving said index member a fraction of a revolution for each revolution of the drive member;

a roller bearing adjacent each of said radial slots, the roller bearing being engaged by said groove when the cam follower is disengaged from the radial slot, positively locking the index member until the roller bearing is disengaged from the groove the cam follower then engaging the next one of the plurality of radial slots.

6. A positive locking Geneva motion mechanism as defined in claim 5 wherein said roller bearing comprises:

a race rotatable about a plurality of rollers, said rollers being interposed between a bushing and a lock screw enabling the race to frictionally engage the groove without binding therein while positively locking the index member as the race traverses the groove.

7. A positive locking Geneva motion mechanism as defined in claim 6 wherein said drive member is of a pie-shaped design having a semi-circular periphery and radial surfaces, the radial surfaces intersecting at its geometric center.

8. A positive locking Geneva motion mechanism as defined in claim 7 wherein said peripheral ridge and semi-circular periphery are integral, the peripheral ridge extending the circumference of said semi-circular periphery.

9. A positive locking Geneva motion mechanism as defined in 8 wherein the means for imparting continual rotation to said drive member is a motor.

References Cited

UNITED STATES PATENTS 3,361,005   1/1968   Carpenter _____ 74—436

LEONARD H. GERIN, Primary Examiner